US008331940B2

(12) United States Patent
Kim et al.

(10) Patent No.: US 8,331,940 B2
(45) Date of Patent: Dec. 11, 2012

(54) METHOD AND DEVICE FOR TRANSMITTING SCANNING START INFORMATION OF DIFFERENT RADIO ACCESS NETWORK

(75) Inventors: Won-Ik Kim, Daejeon (KR);
Sung-Geun Jin, Daejeon (KR); Sung Cheol Chang, Daejeon (KR); Chul Sik Yoon, Seoul (KR); Jee Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/219,593

(22) Filed: Aug. 26, 2011

(65) Prior Publication Data

US 2011/0312364 A1 Dec. 22, 2011

Related U.S. Application Data

(63) Continuation of application No. PCT/KR2010/001259, filed on Feb. 26, 2010.

(30) Foreign Application Priority Data

Feb. 27, 2009 (KR) .......................... 10-2009-0016998
Feb. 26, 2010 (KR) .......................... 10-2010-0018000

(51) Int. Cl.
*H04W 36/00* (2009.01)

(52) U.S. Cl. ...................... 455/436; 455/421; 455/422.1; 455/432.1; 455/437; 455/438; 455/439; 455/440; 455/441; 455/442; 455/443; 455/444; 455/552.1; 455/553.1; 370/310.2; 370/328; 370/331; 370/332; 370/333; 370/334; 370/338

(58) Field of Classification Search .................. 455/421, 455/422.1, 432.1, 436, 437, 438, 439, 440, 455/441, 442, 443, 444, 552.1, 553.1; 370/310.2, 370/328, 331–334, 338
See application file for complete search history.

(56) References Cited

U.S. PATENT DOCUMENTS 5,355,514 A * 10/1994 Borg .............................. 455/423

FOREIGN PATENT DOCUMENTS

| KR | 1020090008884 A | 1/2009 |
| WO | WO 2007/049936 A1 | 5/2007 |

OTHER PUBLICATIONS

E. Jugl et al., "Strategy and performance of UMTS—GSM handover", International Conf. 3G Mobile Comm. Tech., Jun. 25-27, 2003, pp. 217-221, IEE, Stevenage, SG1 2AY United Kingdom.

(Continued)

*Primary Examiner* — Steve D Agosta

(57) ABSTRACT

A method and device for providing reference information for starting scanning a different radio access network to a terminal in a boundary area is provided. A receiver supporting a plurality of access systems includes a receiving circuit for receiving a scanning threshold from a transmitter, a first measuring module for measuring channel quality of a serving cell, and a second measuring module for starting scanning a neighboring cell that is a different radio access network when channel quality of the serving cell is less than the channel quality threshold. The receiver may further include a handover module for performing handover to the neighboring cell when the channel quality of the neighboring cell measured by the second measuring module is greater than that of the serving cell.

15 Claims, 5 Drawing Sheets

U.S. PATENT DOCUMENTS

| | | | |
|---|---|---|---|
| 5,867,785 A * | 2/1999 | Averbuch et al. | 455/436 |
| 2005/0288017 A1 | 12/2005 | Doumenc et al. | |
| 2008/0049673 A1 | 2/2008 | Park et al. | |
| 2010/0008324 A1 * | 1/2010 | Lee et al. | 370/331 |

OTHER PUBLICATIONS

Seunghyun Lee et al., "Inter-RAT Handover Technique from WCDMA Network", Inernational Conf. Mobile Technology, Application and System, Nov. 15-17, 2005, SK Telecom Co., Ltd., Seongnam, Gyeonggi, Republic of Korea.

Gertie Alsenmyr et al., Handover between WCDMA and GSM, 2003, Ericsson Review No. 1.

Wen-Tsuen Chen et al, "An Adaptive Scheme for Vertical Handoff in Wireless Overlay Networks", 2004, Department of Computer Science, National Tsing-Hua University, Hsin-Chu, Taiwan 300, R.O.C.

Shkumbin Hamiti et al., "IEEE 802.16m System Description Document", Feb. 7, 2009, IEEE.

International Search Report for PCT/KR2010/001259 filed on Feb. 26, 2010.

Written Opinion of the International Searching Authority PCT/KR2010/001259 filed on Feb. 26, 2010.

* cited by examiner

METHOD AND DEVICE FOR TRANSMITTING SCANNING START INFORMATION OF DIFFERENT RADIO ACCESS NETWORK

CROSS-REFERENCE TO RELATED APPLICATION

This application is a continuation of PCT application No. PCT/KR2010/001259, filed on Feb. 26, 2010, which claims priority to and the benefit of Korean Patent Application No. 10-2009-0016998 filed on Feb. 27, 2009 and Korean Patent Application No. 10-2010-0018000 filed on Feb. 26, 2010, the entire contents of which are incorporated herein by reference.

BACKGROUND (a) Field

Embodiments of the present invention relate to a method and device for providing reference information for starting scanning of a different radio access network to a terminal in a boundary area.

(b) Description of the Related Art

Network specifications for supporting a plurality of radio access technologies (RATs) have been proposed.

According to the IEEE 802.16m, when receiving system information broadcast including a network boundary indication from a serving cell, a terminal that is located in a boundary area of the IEEE 802.16m network periodically scans neighboring cells of a different radio access network adjacent to the serving cell.

The terminal refers to the network boundary indication and scans the different radio access network, which however generates the following problems.

First, a multi-mode terminal with multiple RFs periodically activates the RF of the corresponding different radio access network so as to scan the different radio access networks when an inter-RATs handover procedure is not needed, thereby wasting power.

Second, in consideration of a multi-mode terminal with a combined RF, the combined RF that was operable by the 802.16m mode must be switched to the RF for the different radio access network in order to scan the different radio access network. During the switching interval, a data rate is reduced since the data cannot be received from the 802.16m serving cell.

SUMMARY

Embodiments of the present invention provide a method for preventing undesirably scanning of a different radio access network.

An embodiment of the present invention provides a method for a transmitter to transmit scanning start information of a different radio access network, including: receiving a report on channel quality for a neighboring cell that is a different radio access network from a receiver; updating a scanning threshold for determining whether to start scanning the neighboring cell by using the channel quality of the neighboring cell; and transmitting the updated scanning threshold to the receiver.

The method further includes: reducing the scanning threshold when the channel quality of the neighboring cell is greater than the scanning threshold; and/or increasing the scanning threshold when the channel quality of the neighboring cell is less than the scanning threshold.

Another embodiment of the present invention provides a transmitter for transmitting scanning start information of a different radio access network, including: a receiving circuit for receiving a report on channel quality of a neighboring cell that is a different radio access network from a receiver; a threshold computing module for updating a scanning threshold for determining whether to start scanning the neighboring cell by using the channel quality of the neighboring cell; and an advertising module for transmitting the updated scanning threshold to the receiver.

Yet another embodiment of the present invention provides a receiver for supporting a plurality of access systems, including: a receiving circuit for receiving a scanning threshold from a transmitter; a first measuring module for measuring channel quality of a serving cell; and a second measuring module for starting to scan a neighboring cell that is a different radio access network when the channel quality of the serving cell is less than the channel quality threshold.

The receiver further includes a transmitting circuit for transmitting the channel quality measured by the second measuring module for the neighboring cell that is a different radio access network to the transmitter.

The receiver further includes a handover module for performing handover to the neighboring cell when the channel quality of the neighboring cell measured by the second measuring module is greater than the channel quality of the serving cell.

The second measuring module further scans the neighboring cell that is a same radio access network when the channel quality of the serving cell is less than the channel quality threshold.

The handover module attempts handover to the neighboring cell that is the same radio access network when the channel quality for the neighboring cell that is the same radio access network is greater than the channel quality of the serving cell.

The handover module performs handover to the neighboring cell that is the different radio access network when the channel quality for the neighboring cell that is the same radio access network is less than the channel quality of the serving cell and the channel quality for the neighboring cell that is the different radio access network is greater than the channel quality of the serving cell.

In the three embodiments of the present invention, the scanning threshold is transmitted with a network boundary indication.

According to embodiments of the present invention, power consumption is minimized and the data rate is improved by preventing a terminal in a boundary area from scanning a different radio access network.

DETAILED DESCRIPTION

In general, a communication system includes a transmitter and a receiver. The transmitter and the receiver perform a transmitting function and a receiving function as a transceiver. For ease of description in the present invention, a unit for transmitting system information broadcasting or an inter-RAT scanning threshold to a network will be defined to be a transmitter, and another unit for transmitting a scanning result to the transmitter will be defined to be a receiver.

The transmitter can be called a base station (BS) or an advanced base station (ABS), and the receiver can be referred to as a mobile station (MS) or an advanced mobile station (AMS).

When the communication system to which the present invention is applied is assumed to be a cellular-based wireless mobile communication system, a serving cell represents a cell in a service area to which the receiver belongs.

Figure 1:
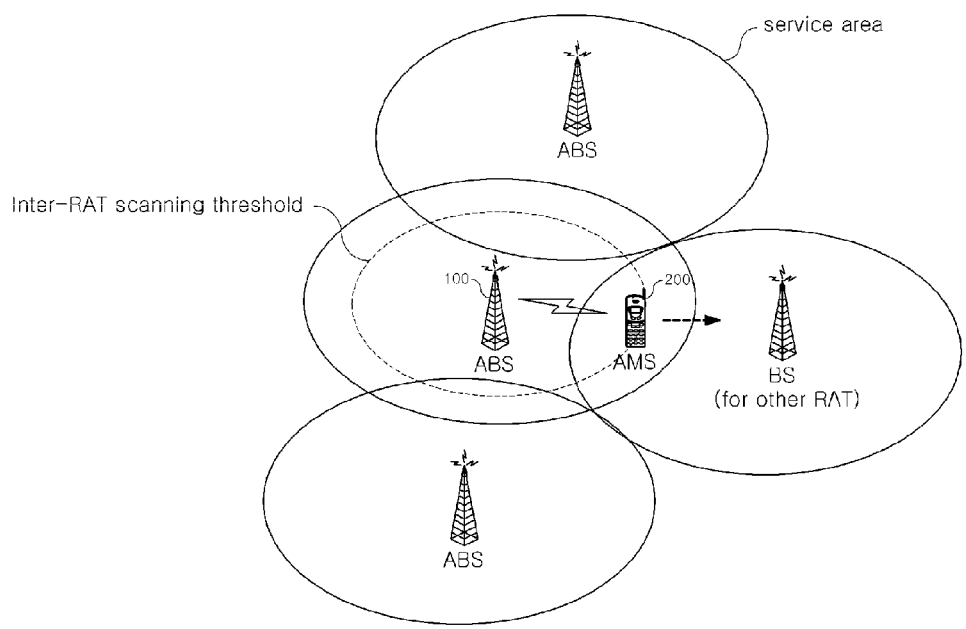
FIG. 1 shows a topology of a communication network according to an embodiment of the present invention.

FIG. 1 shows a topology of a communication network according to an embodiment of the present invention.

In FIG. 1, the communication network is a multi-RAT system using at least two radio access technologies (RATs). Therefore, the receiver 200 according to an embodiment of the present invention can be a multi-mode terminal that supports a plurality of RATs.

For ease of description, it is assumed that the communication network includes a serving cell of the first RAT to which the transmitter 100 and the receiver 200 belong and a neighboring cell of the second RAT. Hence, throughout the specification, the neighboring cell includes the serving cell and neighboring cells for supporting other types of RATs. For example, when the first RAT is the IEEE 802.16m system, the second RAT can be defined to be a non-IEEE 802.16m system such as the long term evolution (LTE) system or the 3rd generation (3G) system.

The receiver 200 moves from the serving cell to the neighboring cell, and is currently located in a boundary area of the serving cell and the neighboring cell.

The receiver 200 starts to scan the neighboring cells so as to check a handover possibility toward a neighboring cell when channel quality of the serving cell reaches a predetermined threshold (hereinafter, an inter-RAT scanning threshold). In detail, the scanning threshold is a reference value for the receiver 200 to determine whether to start scanning the neighboring cells so as to perform the inter-RAT handover procedure.

The scanning threshold is generated by the transmitter 100 by using the channel quality of the serving cell reported by the receivers 200 in the serving cell. The transmitter 100 generates a scanning threshold for each predetermined period to update a stored value with it, and provides the updated scanning threshold to the receivers 200 in the serving cell.

Accordingly, since the receiver 200 scans the neighboring cells only when the inter-RAT handover procedure is required, power consumption caused by scanning unneeded neighboring cells can be reduced.

A configuration of a transmitter and a receiver according to an embodiment of the present invention will now be described.

<Topology of Transmitter>

Figure 2:
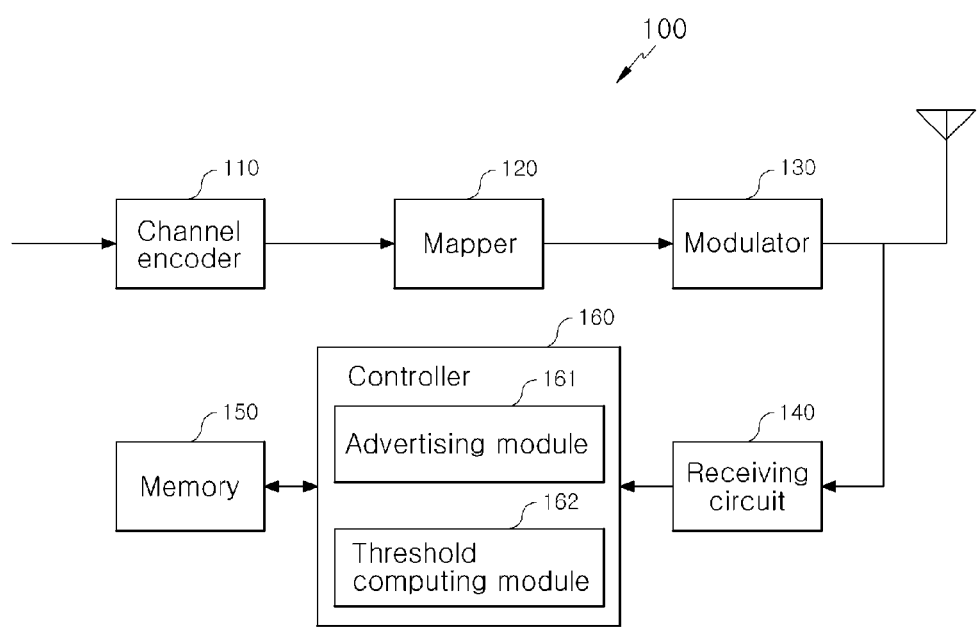
FIG. 2 shows a topology of a transmitter according to an embodiment of the present invention.

FIG. 2 shows a topology of a transmitter according to an embodiment of the present invention.

The transmitter 100 includes a channel encoder 110, a mapper 120, a modulator 130, a receiving circuit 140, a memory 150, and a controller 160.

The channel encoder 110 encodes a stream of information bits according to a predetermined coding scheme to generate coded data. The channel encoder 110 can add error detecting bits such as a cyclic redundancy check (CRC) bit to the stream of information bits, and can further add additional codes for error correction such as a turbo code, a low density parity check code (LDPC), or a convolutional code.

The mapper 120 maps the encoded data output by the channel encoder 110 on symbols that are displayed with respect to amplitude and position of a constellation of a phase. The modulation scheme includes m-quadrature phase shift keying (m-PSK) and m-quadrature amplitude modulation (m-QAM).

When the transmitter 100 supports multiple access modulation, the transmitter 100 may further include a modulator 130 for modulating the mapped transmitted symbols according to a predetermined multiple access modulation scheme. The multiple access modulation scheme includes a single-carrier modulation scheme such as the CDMA and a multi-carrier modulation such as the OFDM scheme.

The receiving circuit 140 receives the signals from the receiver through an antenna, converts them into digital signals, and transmits them to the controller 160. Information extracted from the signal received by the receiving circuit 140 includes channel quality of the serving cell.

The channel quality is information fed back by the receiver to the transmitter 100, and it includes at least one of channel quality information (CQI), channel state information (e.g., signal to interference and noise ratio (SINR) or signal to noise ratio (SNR)), and signal strength information.

The memory 150 stores a scanning threshold in addition to various types of system information for operating the transmitter 100.

The controller 160 controls the transmitter 100, and it particularly includes an advertising module 161. Optionally, the controller 160 may further include a threshold computing module 162.

The advertising module 161 advertises the scanning threshold to the receivers 200 located in the network boundary of the cell to which the transmitter 100 belongs. The scanning threshold can be included in the other access network information with the network boundary indication, and can then be advertised. For example, in the wireless MAN-OFDMA advanced network, different radio access network information can be advertised by using an AAI-L2-XFER message. The advertising module 161 can advertise the scanning threshold to the receivers 200 at a predetermined period, and can additionally advertise it when it is updated.

The initial scanning threshold is obtainable through a field test performed on the network boundary between the different radio access networks when the network is initially configured. The initial scanning threshold can be used as a constant value, or can be updated. That is, in the actual service case, since the location and time of the receiver 200 or a channel condition of the network are changeable in real time, the scanning threshold must be dynamically updated so as to acquire the most desirable scanning threshold. For this purpose, the threshold computing module 162 can be additionally provided.

The threshold computing module 162 determines a new scanning threshold by comparing the channel quality of the neighboring cell transmitted by the receivers 200 in the boundary area and the scanning threshold stored in the memory 150, updates the existing scanning threshold with the determined scanning threshold, and transmits the updated scanning threshold to the advertising module 161.

The determination process of the scanning threshold will now be described.

Figure 3:
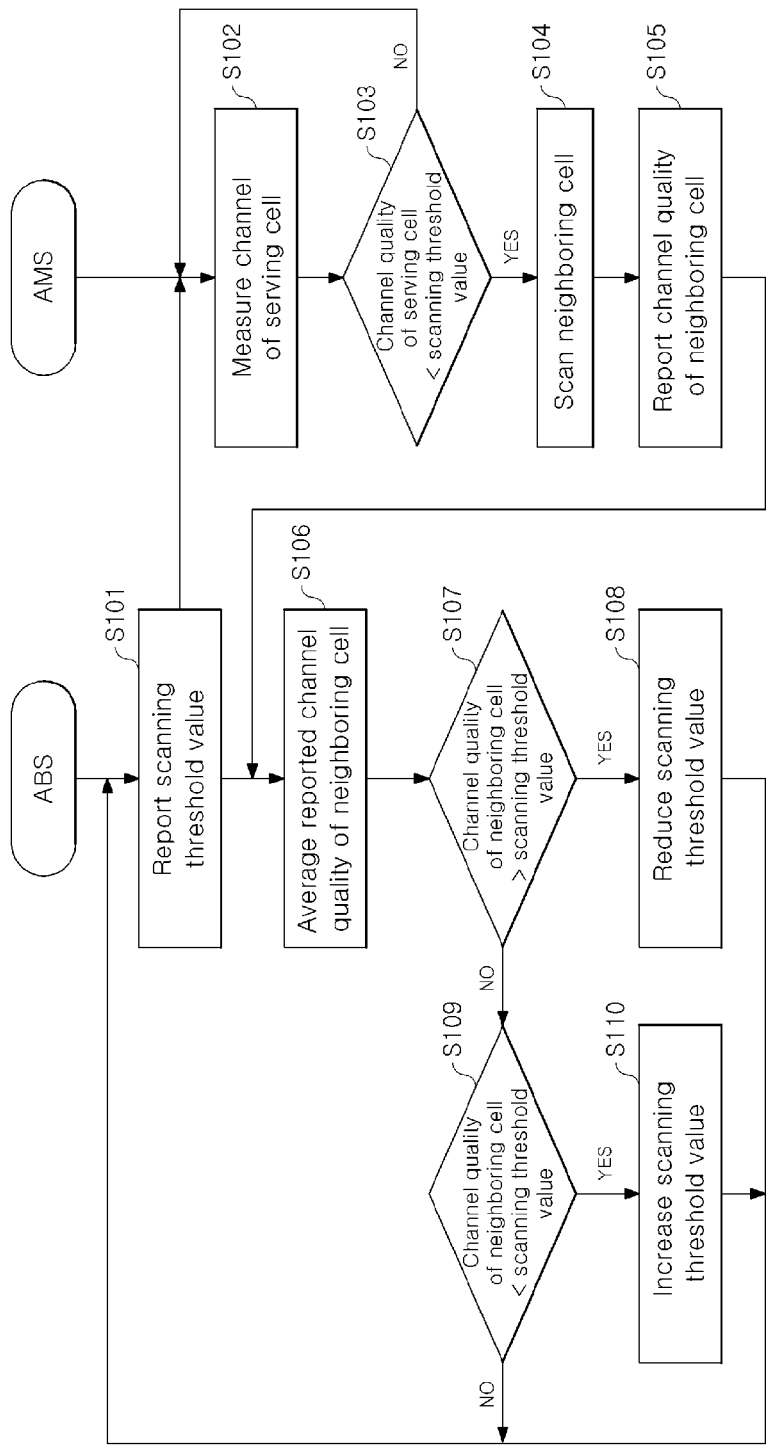
FIG. 3 shows a flowchart of a method for a transmitter to determine a scanning threshold.

FIG. 3 shows a flowchart of a method for a transmitter to determine a scanning threshold.

When the advertising module 161 advertises the scanning threshold to the receiver 200 in the network boundary (S101), the receiver 200 compares the measured channel quality of the serving cell (S102) and the scanning threshold (S103), and starts scanning the neighboring cell when the channel quality of the serving cell is less than (or, less than or equal to) the scanning threshold (S104).

The receiver 200 reports the channel quality of the neighboring cell to the transmitter 100 of the serving cell (S105), and the threshold computing module 162 of the transmitter 100 determines a new scanning threshold by comparing the channel quality of the neighboring cell reported by the receiver 200 and the stored scanning threshold.

In detail, the threshold computing module 162 reduces the scanning threshold (S108) when the channel quality of the neighboring cell reported by the receiver 200 is greater than the stored scanning threshold (S107), and it increases the scanning threshold (S110) in another case (S109). According to the updated scanning threshold, the receiver 200 can start to scan the neighboring cell in a further desirable condition. The advertising module 161 advertises the updated scanning threshold to the receivers 200 of the serving cell to use the same for the next scanning of the neighboring cell.

Since a plurality of receivers 200 may exist on the boundary area, the transmitter 100 can receive reports with a plurality of channel qualities. In this case, the threshold computing module 162 of the transmitter 100 determines a new scanning threshold by comparing an averaged value (S106) of the channel qualities of the neighboring cells reported by a plurality of receivers 200 and the stored scanning threshold.

<Topology of Receiver>

Figure 4:
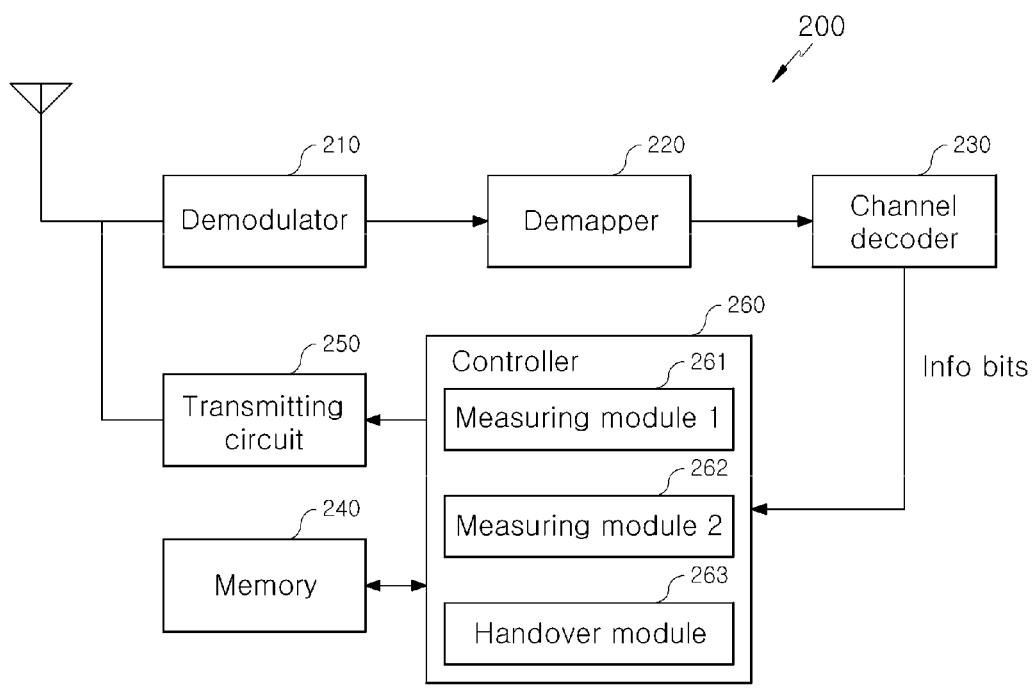
FIG. 4 shows a configuration of a receiver according to an embodiment of the present invention.

FIG. 4 shows a configuration of a receiver according to an embodiment of the present invention.

Referring to FIG. 4, the receiver 200 includes a channel decoder 210, a demapper 220, a demodulator 230, a memory 240, a transmitting circuit 250, and a controller 260.

The demodulator 230, the demapper 220, and the channel decoder 210 of the receiver 200 perform the opposite functions of the described modulator 130, mapper 120, and channel encoder 110 of the transmitter 100. In detail, the signal received through the antenna is demodulated by the demodulator 230, and is then demapped to be encoded data by the demapper 220. The encoded data are decoded by the channel decoder 210. The demodulator 230, the demapper 220, and the channel decoder 210 can be called a receiving circuit (not shown) overall.

The memory 240 stores the scanning threshold in addition to various types of system information for operating the receiver 200.

The transmitting circuit 250 converts the channel quality of the neighboring cell provided by the controller 260 into an analog signal, and transmits the same to the transmitter 100 through the antenna.

The controller 250 controls the receiver 200, and includes a first measuring module 251 for measuring a channel of the serving cell, a second measuring module 252 for measuring a channel of the different radio access network, and a handover module 253.

Figure 5:
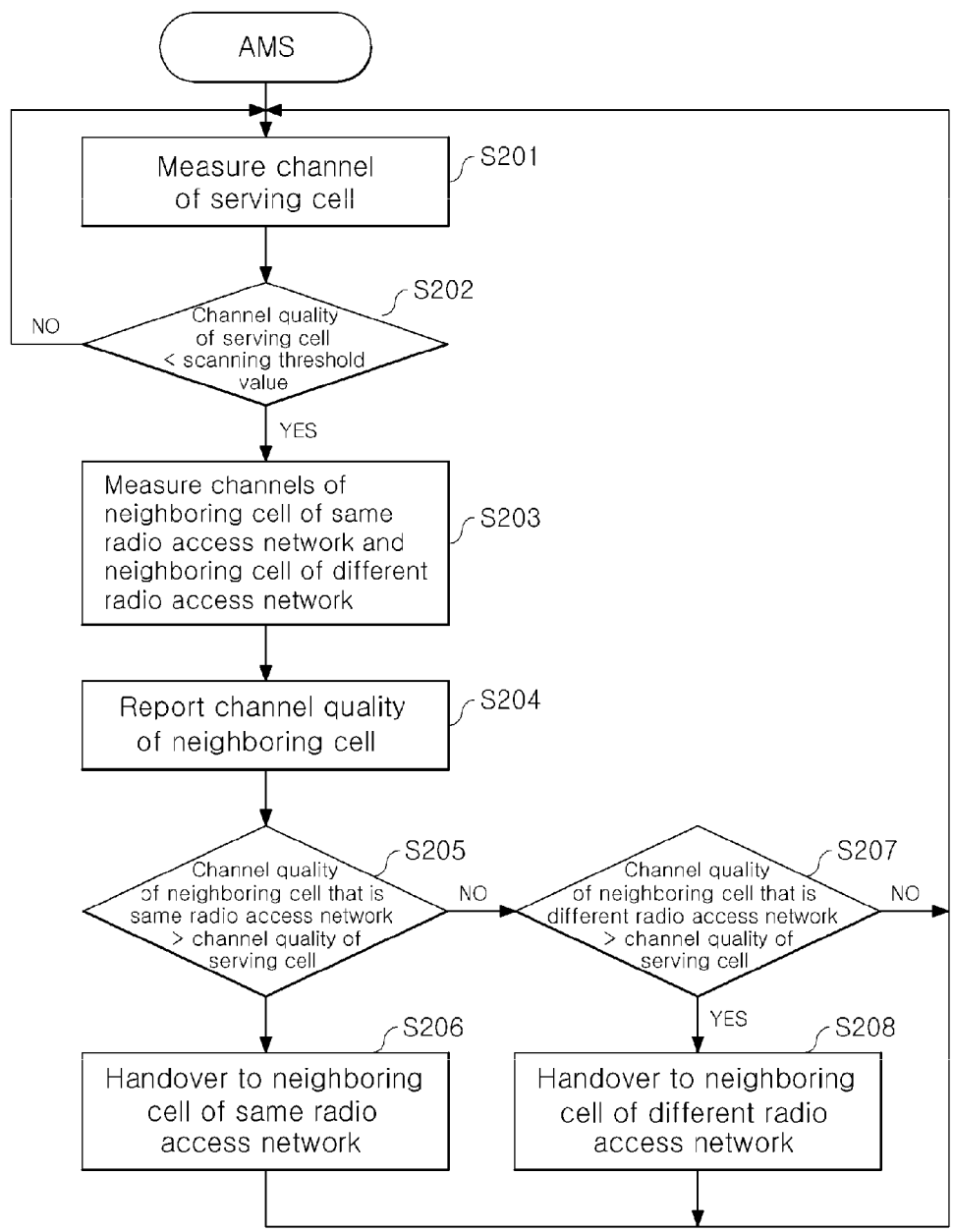
FIG. 5 shows a flowchart of a method for a receiver to scan a neighboring cell.

A process for the controller 250 to scan the neighboring cell will now be described. FIG. 5 shows a flowchart of a method for a receiver to scan a neighboring cell.

The first measuring module 251 periodically measures the channel quality of the serving cell to which the receiver 200 belongs (S201).

The second measuring module 252 compares the channel quality of the serving cell and the channel quality threshold stored in the memory 240 (S202), and measures the channel quality of the neighboring cell when the channel quality of the serving cell is less than (or, less than or equal to) the channel quality threshold stored in the memory 240. Further, the second measuring module 252 reports the measured channel quality of the neighboring cell to the transmitter 100 of the serving cell (S204) to use the same for updating the channel quality threshold.

When the channel quality of the neighboring cell measured by the second measuring module 252 is greater than the channel quality of the serving cell, the handover module 253 performs a handover process between the neighboring cells.

When a neighboring cell available for handover is detected, the second measuring module 252 can detect whether there is a neighboring cell that is a same radio access network available for handover before performing a handover to the detected neighboring cell.

In detail, the second measuring module 252 scans the neighboring cell that is a different radio access network and the neighboring cell that is the same radio access network when the channel quality of the serving cell is less than (or equal to) the channel quality threshold stored in the memory 240 (S203). The handover module 253 attempts handover to the neighboring cell that is a same radio access network (S206) when the channel quality of the neighboring cell that is the same radio access network is greater than the channel quality of the serving cell (S205). Therefore, when channel quality of the neighboring cell that is the same radio access network is less than that of the serving cell and the channel quality of the neighboring cell that is a different radio access network is greater than that of the serving cell (S207), the handover is performed to the neighboring cell that is a different radio access network (S208).

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The embodiments of the present invention are applicable to methods and devices for providing reference information for starting to scan a different radio access network to the terminal in the boundary area.

The above-described embodiments can be realized through a program for realizing functions corresponding to the configuration of the embodiments or a recording medium for recording the program in addition to through the above-described device and/or method, which is easily realized by a person skilled in the art.

What is claimed is:

1. A receiver for supporting a plurality of radio access technologies (RATs), the receiver comprising:
   a receiving circuit configured to receive a network boundary indication from a transmitter, the network boundary indication indicating that the receiver is located in a boundary area of a first radio access network;
   a measuring module configured to scan a first neighboring cell that belongs to a second radio access network if a channel quality of a serving cell is below a scanning threshold and the receiving circuit has received the network boundary indication; and
   a handover module configured to decide a handover based on a channel quality of the first neighboring cell,
   wherein the first and second radio access networks correspond to different RATs,
   wherein the measuring module is configured to scan a second neighboring cell that belongs to the first radio access network if the channel quality of the serving cell is less than the scanning threshold, the second neighboring cell being adjacent to the serving cell in the first radio access network, wherein the handover module is configured to perform the handover to the second neighboring cell if the channel quality of the second neighboring cell is greater than the channel quality of the serving cell, and wherein the handover module is configured to perform the handover to the first neighboring cell if the channel quality of the second neighboring cell is less than the channel quality of the serving cell and the channel quality of the first neighboring cell is greater than the channel quality of the serving cell.

2. The receiver of claim 1, wherein the receiving circuit is configured to receive the scanning threshold from the transmitter.

3. The receiver of claim 1, wherein the receiving circuit is configured to receive the network boundary indication through an AAI-L2-XFER message.

4. The receiver of claim 3, wherein the AAI-L2-XFER message further includes information on the second radio access network.

5. The receiver of claim 1, wherein the measuring module is configured to measure the channel quality of the first neighboring cell when scanning the first neighboring cell.

6. The receiver of claim 1, wherein the handover module is configured to perform the handover to the first neighboring cell when the channel quality of the first neighboring cell is greater than the channel quality of the serving cell.

7. The receiver of claim 1, wherein the scanning threshold is updated for a next scanning by the transmitter for each predetermined period using a channel quality of a neighboring cell that is reported by the receiver as a cell to which there has been a handover of the receiver.

8. A handover method of a receiver supporting a plurality of radio access technologies (RATs), the method comprising:

receiving a network boundary indication from a transmitter, the network boundary indication indicating that the receiver is located in a boundary area of a first radio access network;

scanning, by a measuring module, a first neighboring cell that belongs to a second radio access network if a channel quality of a serving cell is below a scanning threshold and the receiver has received the network boundary indication;

deciding, by a handover module, a handover based on a channel quality of the first neighboring cell;

scanning, by the measuring module, a second neighboring cell that belongs to the first radio access network if the channel quality of the serving cell is less than the scanning threshold, the second neighboring cell being adjacent to the serving cell in the first radio access network, wherein the first and second radio access networks correspond to different RATs, and wherein deciding the handover comprises:

performing the handover to the second neighboring cell if the channel quality of the second neighboring cell is greater than the channel quality of the serving cell; and performing the handover to the first neighboring cell if the channel quality of the second neighboring cell is less than the channel quality of the serving cell and the channel quality of the first neighboring cell is greater than the channel quality of the serving cell.

9. The method of claim 8, wherein scanning the first neighboring cell includes measuring the channel quality of the first neighboring cell.

10. The method of claim 8, wherein receiving the network boundary indication includes receiving the network boundary indication through an AAI-L2-XFER message.

11. The method of claim 10, wherein the AAI-L2-XFER message further includes information on the second radio access network.

12. The method of claim 8, further comprising receiving the scanning threshold from the transmitter.

13. The receiver of claim 7, wherein the scanning threshold is reduced if the channel quality of the neighboring cell reported by the receiver is greater than a previous scanning threshold stored in the transmitter, and is increased if otherwise.

14. The method of claim 8, wherein the scanning threshold is updated for a next scanning by the transmitter for each predetermined period using a channel quality of a neighboring cell that is reported by the receiver as a cell to which there has been a handover of the receiver.

15. The receiver of claim 14, wherein the scanning threshold is reduced if the channel quality of the neighboring cell reported by the receiver is greater than a previous scanning threshold stored in the transmitter, and is increased if otherwise.

* * * * *